(12) United States Patent
Eling et al.

(10) Patent No.: US 8,901,186 B2
(45) Date of Patent: *Dec. 2, 2014

(54) PROCESS FOR PRODUCING SILICA-COMPRISING DISPERSIONS COMPRISING POLYETHEROLS OR POLYETHER AMINES

(75) Inventors: Berend Eling, Lemfoerde (DE); Zeljko Tomovic, Lemfoerde (DE); Stefan Auffarth, Westerkappeln (DE)

(73) Assignee: BASF SE, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/203,634

(22) PCT Filed: Mar. 11, 2010

(86) PCT No.: PCT/EP2010/053106
§ 371 (c)(1),
(2), (4) Date: Aug. 26, 2011

(87) PCT Pub. No.: WO2010/103072
PCT Pub. Date: Sep. 16, 2010

(65) Prior Publication Data
US 2011/0313070 A1      Dec. 22, 2011

(30) Foreign Application Priority Data

Mar. 13, 2009  (EP) ..................................... 09155131

(51) Int. Cl.
| | | |
|---|---|---|
| C08K 3/36 | (2006.01) | |
| C01B 33/143 | (2006.01) | |
| C01B 33/145 | (2006.01) | |
| C01B 33/146 | (2006.01) | |
| C01B 33/148 | (2006.01) | |

(52) U.S. Cl.
USPC ............. 521/112; 516/34; 521/110; 521/111; 521/122; 521/163; 521/174; 521/176; 524/730; 524/789; 524/790; 528/28; 528/29; 528/68; 528/76; 528/77

(58) Field of Classification Search
USPC ............ 516/34; 521/110, 111, 112, 122, 163, 521/174, 176; 524/730, 789, 790; 528/28, 528/29, 68, 76, 77
See application file for complete search history.

(56) References Cited

U.S. PATENT DOCUMENTS

2004/0147029 A1   7/2004  Adam
2008/0306203 A1  12/2008  Adam et al.

FOREIGN PATENT DOCUMENTS

| DE | 103 38 164 | | 3/2005 |
|---|---|---|---|
| EP | 0 699 626 | | 3/1996 |
| EP | 1 236 765 | | 9/2002 |
| EP | 1 366 112 | | 12/2003 |
| JP | 58-13620 | * | 1/1983 |
| WO | 01 05883 | | 1/2001 |
| WO | WO 03/016370 | * | 2/2003 |
| WO | 2004 035473 | | 4/2004 |
| WO | 2004 035649 | | 4/2004 |
| WO | 2005 056174 | | 6/2005 |
| WO | 2006 128793 | | 12/2006 |

OTHER PUBLICATIONS

U.S. Appl. No. 13/381,116, filed Dec. 28, 2011, Kunst, et al.
U.S. Appl. No. 13/229,005, filed Sep. 9, 2011, Eling, et al.
International Search Report issued Jul. 12, 2010 in PCT/EP10/053106 filed Mar. 11, 2010.

* cited by examiner

Primary Examiner — Rabon Sergent
(74) Attorney, Agent, or Firm — Oblon, Spivak, McClelland, Maier & Neustadt, L.L.P.

(57) ABSTRACT

Process for producing silica-comprising dispersions comprising a polyetherol or a polyether amine, which comprises the steps of
(i) admixing an aqueous silica sol (K) having an average particle diameter of from 1 to 150 nm and a silica content, calculated as $SiO_2$, of from 1 to 60% by weight and a pH of from 1 to 6 with at least one polyetherol (b1) and/or polyether amine (b2) based on ethylene oxide and/or propylene oxide and having an average OH or amine functionality of from 2 to 6 and a number average molecular weight of from 62 to 6000 g/mol,
(ii) distilling off at least part of the water,
(iii) admixing the dispersion with at least one compound (S) having at least one at least monoalkoxylated silyl group and at least one alkyl, cycloalkyl or aryl substituent, where this substituent may have groups which are reactive toward an alcohol, an amine or an isocyanate in an amount of from 0.1 to 20 µmol of (S) per $m^2$ of surface area of (K), where steps (i) and (iii) can be carried out simultaneously or in succession in any order,
(iv) optionally adjusting the pH of the silica-comprising dispersions obtained to a value of from 7 to 12 by adding a basic compound,
where step (iv) can also be carried out between steps (ii) and (iii).

18 Claims, No Drawings

PROCESS FOR PRODUCING SILICA-COMPRISING DISPERSIONS COMPRISING POLYETHEROLS OR POLYETHER AMINES

The invention relates to a process for producing silica-comprising dispersions comprising polyetherols or polyether amines and their use for producing polyurethane materials.

It is known that the mechanical properties of polyurethane materials can be influenced in a targeted manner by the presence of nanoparticles in the components of the polyurethane materials (isocyanate component or polyol component).

Thus, DE-A 103 38 164 discloses a process for producing a polyurethane foam, which comprises reacting a polyisocyanate and a polyol in the presence of a blowing agent and silica gel particles, with the silica gel particles being functionalized by means of aminopropyltriethoxysilane. The silanization reagent makes the particle surface of the silica gel particles hydrophilic, with this hydrophilic surface having surface groups which are reactive toward isocyanate. As a result, the particles are built covalently into the polymer matrix of the foam during the polymerization reaction to form the polyurethane foam and act as reinforcing material. In this way, the proportion of open cells in the polyurethane foam can be regulated, which can lead to an improvement in the acoustic properties (acoustic insulation) and the thermal insulation capability of the polyurethane foam. The surface-functionalized $SiO_2$ particles are introduced into the polyol component. The $SiO_2$ particles are preferably produced from tetraethoxysilane in an organic solvent. This synthetic route is costly since an expensive precursor is used and, in addition, the particle yield of the synthesis is low. Furthermore, this synthesis gives particles having a size of 100 nm or more, which can be regarded as conventional fillers.

EP-A 1 366 112 discloses a process for producing a silicon dioxide dispersion by a) placing an aqueous silicate solution in a reaction vessel, b) polycondensing the silicate to a particle size of from 3 to 50 nm, c) bringing the silica sol obtained to an alkaline pH, d) optionally evaporating the sol, e) mixing the sol with constituents of the outer, flowable phase of the dispersion and f) optionally removing water and/or other solvent constituents from the dispersion. As outer flowable phase, mention is made of polyols, polyamines, linear or branched polyglycol ethers, polyesters and polylactones. In the examples, a silica sol whose pH has been adjusted to 10.5-11 is mixed with isopropanol and the water is removed by atmospheric distillation to a content of <0.1%. Various polyethers were then added while stirring. The volatile constituents were subsequently removed by distillation at 50° C. under reduced pressure. Mention is made of the use of these silicon dioxide dispersions for producing closed-celled or open-celled foams based on polyurethanes, polysiloxanes, polyolefins or polystyrene. The sols have a pH of from 10 to 12 and are therefore difficult to handle. The sols have only a low concentration of silicon dioxide particles (up to 15 parts of $SiO_2$ particles per 100 parts of sol). Relatively large amounts of solvent are necessary, which makes production of the silicon dioxide dispersions expensive.

EP-A 0 699 626 discloses a process for producing a stable silicon dioxide-propanol sol by replacing the aqueous medium of an acidic aqueous silicon dioxide sol by propanol by adding propanol to the silicon dioxide sol and distilling the sol, with methanol also being added. The presence of polyol is not mentioned. The sols are used as component in coating compositions for producing hard and thin films on lenses, bottles and films of synthetic resins, with the colloidal silicon dioxide functioning as microfiller in the hard and thin film formed.

WO 01/05883 discloses a process for producing polyurethane elastomers comprising nanosize fillers. It concerns exclusively polyester-based elastomers. Silicon dioxide having a pH of 8-9 in isopropanol is used as starting material for producing such elastomers.

WO 2004/035473 discloses a process for producing silanized colloidal silicon dioxide dispersions and their use in coating compositions or as additive for cement materials. For this purpose, an aqueous silica sol is preferably mixed with a silane, in particular an epoxysilane, diluted with water at a pH of preferably from 6 to 12.

WO 2006/128793 relates to a process for producing pulverulent colloidal particles of amorphous silicon dioxide. Here, a silica sol stabilized in the alkaline range and having a particle size in the range from 8 to 250 nm is diluted with water and/or a water-soluble organic solvent, a silane and/or a polyol or a dicarboxylic acid is added, the sol is deionized by means of an anion exchanger or cation-exchange resin, the silylated deionized sol is dried under reduced pressure and the dried sol is optionally milled to a fine powder. The silylated silicon dioxide powder can be dispersed in the polyol component or in the isocyanate component for producing polyurethanes. The redispersion of particles having a particle size significantly smaller than 100 nm can be difficult since the particle-particle interactions are too high to obtain agglomerate-free dispersions, for example in polyol. The handling of the fine powder additionally requires occupational hygiene precautions.

It is an object of the invention to provide dispersions of silicon dioxide particles having a particle diameter of <150 nm in polyols and polyether amines. The process for producing the silica-comprising dispersions should be able to be carried out starting from commercially available water-based silica sols.

The object is achieved by a process for producing silica-comprising dispersions comprising a polyetherol or a polyether amine, which comprises the steps of (i) admixing an aqueous silica sol (K) having an average particle diameter of from 1 to 150 nm and a silica content, calculated as $SiO_2$, of from 1 to 60% by weight and a pH of from 1 to 6 with at least one polyetherol (b1) and/or polyether amine (b2) based on ethylene oxide and/or propylene oxide and having an average OH or amine functionality of from 2 to 6 and a number average molecular weight of from 62 to 6000 g/mol, (ii) distilling off at least part of the water, (iii) admixing the dispersion with at least one compound (S) having at least one at least monoalkoxylated silyl group and at least one alkyl, cycloalkyl or aryl substituent which may comprise heteroatoms, where this substituent may have groups which are reactive toward an alcohol, an amine or an isocyanate in an amount of from 0.1 to 20 µmol of (S) per m² of surface area of (K), where steps (i) and (iii) can be carried out simultaneously or in succession in any order, (iv) optionally adjusting the pH of the silica-comprising dispersions obtained to a value of from 7 to 12 by adding a basic compound, where step (iv) can also be carried out between steps (ii) and (iii).

Adjusting the pH of the aqueous silica sol (K) to a value of from 1 to 6 alters the solubility properties of the aqueous silica sol.

It has been found that polyetherols and polyether amines based on ethylene oxide and/or propylene oxide and having an average OH or amine functionality of from 2 to 6 and a number average molecular weight of from 62 to 6000 g/mol have a sufficiently high solubility in water. The presence of solubilizing low molecular weight organic solvents such as methanol, ethanol, propanols, butanols, THF, 1,4-dioxane, dimethylformamide, acetonitrile, dimethyl sulfoxide or acetone is therefore not necessary.

The aqueous colloidal solutions (K) of polysilicic particles (silica sol) which are used comprise particles having an average diameter of from 1 to 150 nm, preferably from 2 to 120 nm, particularly preferably from 3 to 100 nm, very particularly preferably from 4 to 80 nm, in particular from 5 to 50 nm and especially from 8 to 40 nm.

The silica content, calculated as $SiO_2$, is from 1 to 60% by weight, preferably from 5 to 55% by weight, particularly preferably from 10 to 40% by weight. It is also possible to use silica sols having a low content, but the additional content of water then has to be separated off by distillation in a later step.

The aqueous solutions (K) are colloidal solutions of polysilicic acid which may optionally be stabilized by a small amount of alkali metal, alkaline earth metal, ammonium, aluminum, iron(II), iron(III) and/or zirconium ions, preferably alkali metal, alkaline earth metal, ammonium and/or iron(III) ions, particularly preferably alkali metal, alkaline earth metal and/or ammonium ions, very particularly preferably alkali metal and/or alkaline earth metal ions and in particular alkali metal ions.

Among alkali metal ions, sodium and/or potassium ions are preferred and sodium ions are particularly preferred.

Among alkaline earth metal ions, magnesium, calcium and/or beryllium ions are preferred, magnesium and/or calcium ions are particularly preferred and magnesium ions are very particularly preferred.

The molar ratio of metal ions to silicon atoms in (K) is from 0:1 to 0.1:1, preferably 0.002-0.04:1.

After adjustment of the pH, the silica sol (K) used has a pH of the aqueous phase of from 1 to 6, preferably from 2 to 4.

For the purposes of the present text, an aqueous colloidal solution is a solution of optionally stabilized silica particles which have an average particle diameter in the range from 1 to 150 nm and do not settle even during storage for a period of one month at 20° C.

For the purposes of the present text, a sol is a colloidally disperse, incoherent (i.e. each particle is freely mobile), solution of a solid in water, here, as silica sol, a colloidally disperse solution of silicon dioxide in water.

The acidic aqueous silica sols (K) used according to the invention can, for example, be obtained in three ways:
  by acidification of the corresponding alkaline silica sols,
  by production from low molecular weight silicic acids, preferably water glass, i.e. salt-like particles having a diameter below 1 nm, or
  by condensation of esters of low molecular weight silicic acids.

The aqueous solutions of alkaline silica sols generally have a pH of from 8 to 12, preferably from 8 to 11. These alkaline silica sols are commercially available and thus represent a readily available and preferred starting material for the process of the invention.

The particles in these alkaline silica sols usually have an average particle diameter of from 1 to 150 nm, preferably from 2 to 120 nm, particularly preferably from 3 to 100 nm, very particularly preferably from 4 to 80 nm, in particular form 5 to 50 nm and especially from 8 to 40 nm.

The silica content, calculated as $SiO_2$, is from 1 to 60% by weight, preferably from 5 to 55% by weight, particularly preferably from 10 to 40% by weight. It is also possible to use alkaline silica sols having a lower solids content, but the additional content of water then has to be separated off by distillation in a later step.

The alkaline silica sols can be stabilized by the abovementioned metal ions.

The molar ratio of metal ions to silicon atoms in (K) is from 0:1 to 0.1:1, preferably 0.002-0.04:1.

The pH of these alkaline silica sols is generally at least 8, preferably from 8 to 12, particularly preferably from 8 to 11 and very particularly preferably from 8 to 10.

The silica sols (K) to be used according to the invention are produced from these alkaline silica sols by setting of the desired pH in these silica sols, for example by adding mineral acids or admixing the alkaline silica sols with an ion exchanger. The pH is preferably adjusted by means of ion exchangers, particularly when the silica sol is admixed with a polyether amine.

The acidification can be carried out using any acids, preferably hydrochloric acid, nitric acid, phosphoric acid, sulfuric acid, acetic acid, formic acid, methylsulfonic acid, para-toluenesulfonic acid, or by admixing with an acidic ion exchanger, preferably by acidification with hydrochloric acid, nitric acid, phosphoric acid, sulfuric acid or acetic acid, particularly preferably hydrochloric acid, nitric acid or sulfuric acid and very particularly preferably by acidification with sulfuric acid.

A preferred embodiment comprises producing the silica sols (K) by admixing alkaline silica sols with an ion exchanger. This results in the electrolyte content of the silica sols (K) being low, for example less than 0.2% by weight and preferably less than 0.1% by weight.

For the present purposes, electrolytes are inorganic ion constituents other than silicates, hydroxides and protons. These electrolytes which originate predominantly from the stabilization of the alkaline silica sols are added to the suspension in order to stabilize the particles after they have been produced.

Production of the silica sols (K) from water glass by acidification, for example by means of an ion exchanger or by admixing with mineral acid, is also conceivable. The water glass used for this purpose is preferably potassium and/or sodium silicate which particularly preferably has a ratio of from 1 to 10 mol of $SiO_2$ to 1 mol of alkali metal oxide, particularly preferably from 1.5 to 6 and in particular from 2 to 4 mol of $SiO_2$ to 1 mol of alkali metal oxide.

In this case, the reaction mixture is allowed to react until a silica sol (K) of the desired size has been formed and the process of the invention is then carried out.

The low molecular weight silicic acids (orthosilicic and oligosilicic acid) are normally stable only in highly dilute aqueous solutions having a content of a few percent by weight and are therefore generally concentrated before further use.

Furthermore, the silica sols (K) can be produced by condensation of esters of low molecular weight silicic acids. These are usually $C_1$-$C_4$-alkyl esters, in particular ethyl esters, of oligosilicic acid and in particular orthosilicic acid, which in an acidic or basic medium form silica sols (K).

In step (i), the aqueous acidic silica sol is admixed with a from 0.001 to 100-fold, preferably from 0.01 to 50-fold, particularly preferably from 0.05 to 30-fold, amount of polyetherol (b1) or polyether amine (b2), based on the amount of the silica sol used. In general, this molar ratio is from 0.1 to 5. It is also possible to use mixtures of polyetherol (b1) and polyether amine (b2). Optionally, the sol is diluted beforehand or simultaneously with water.

Suitable polyetherols (b1) have a number average molecular weight of from 62 to 6000 g/mol. They are based on propylene oxide, ethylene oxide or propylene oxide and ethylene oxide.

Suitable polyetherols (b1) are prepared by known methods from a starter molecule comprising from 2 to 6 reactive hydrogen atoms in bound form by polymerization of ethylene oxide and/or propylene oxide. The polymerization can be carried out as an anionic polymerization using alkali metal hydroxides or alkali metal alkoxides as catalysts or as a cationic polymerization using Lewis acids such as antimony pentachloride or boron fluoride etherate. Furthermore, multimetal cyanide compounds, known as DMC catalysts, can also be used as catalysts. Tertiary amines can also be used as catalyst, e.g. triethylamine, tributylamines, trimethylamine, dimethylethanolamine or dimethylcyclohexylamine. Ethylene oxide and propylene oxide can be polymerized in pure form, alternately in succession or as mixtures.

Suitable starter molecules having from 2 to 6 reactive hydrogen atoms are, for example, water and 2- or 3-functional alcohols such as ethylene glycol, 1,2- and 1,3-propanediol, diethylene glycol, dipropylene glycol, 1,4-butanediol, glycerol, trimethylolpropane, also pentaerythritol, sorbitol and sucrose. Further suitable starter molecules are amine starters such as triethanolamine, diethanolamine, ethylenediamine and toluenediamines.

The polyetherols (b1) preferably have an OH number in the range from 100 to 1825.

Particularly preferred polyetherols (b1) are prepared from 2- or 3-functional alcohols, in particular ethylene glycol, trimethylolpropane or glycerol and are ethylene oxide homopolymers, propylene oxide homopolymers or ethylene oxide/propylene oxide copolymers. These particularly preferred polyetherols have a molecular weight of from 62 to 2000 g/mol and an OH number of from 100 to 1825.

It is also possible to use mixtures of polyetherols (b1).

Suitable polyether amines (b2) are generally derived from the polyetherols (b1) by replacing the OH functions by amine functions in an amination step. Here, at least 50% of the OH groups are replaced by amino groups. Preference is given to replacing at least 75% of OH groups, particularly preferably essentially all OH groups, by amino groups. The amine content (total) of the polyether amines (b2) is preferably from 0.3 to 15 meq/g, particularly preferably from 0.5 to 10 meq/g.

It is also possible to use mixtures of polyether amines (b2).

It is also possible to use mixtures of polyetherols (b1) and polyether amines (b2).

In step (ii), water is distilled off from the mixture obtained in step (i). The water is distilled off under atmospheric pressure or reduced pressure, preferably at from 1 to 800 mbar, particularly preferably from 5 to 100 mbar.

The temperature at which the distillation is carried out depends on the boiling point of water at the respective pressure. The temperature is preferably not more than 140° C., particularly preferably not more than 100° C.

The distillation can be carried out batchwise, semicontinuously or continuously.

For example, it can be carried out batchwise from a stirred vessel which can, if appropriate, be superposed by a short rectification column.

The introduction of heat into the stirred vessel is effected via internal and/or external heat exchangers of conventional construction and/or via jacket heating, preferably external convection vaporizers having natural or forced circulation. The mixing of the reaction mixture is carried out in a known way, e.g. by stirring, pumped circulation or natural circulation.

In the continuous variant, the distillation is preferably carried out by passing the material to be distilled through a falling film evaporator or over a heat exchanger.

Suitable distillation apparatuses for this purpose are all distillation apparatuses known to those skilled in the art, e.g. convection vaporizers, thin film evaporators, falling film evaporators, wiped film evaporators, if appropriate with superposed rectification columns or stripping columns in each case. Suitable heat exchangers are, for example, Robert vaporizers or tube or plate heat exchangers.

The water comprised in the silica sol is generally very largely distilled off. The silicate content of the resulting dispersion is generally from 5 to 60% by weight, preferably from 5 to 50% by weight and particularly preferably from 10 to 40% by weight.

The residual water content of the dispersion should be less than 5% by weight, preferably less than 3% by weight, particularly preferably less than 2% by weight, very particularly preferably less than 1% by weight, in particular less than 0.5% by weight and especially less than 0.3% by weight.

As an alternative to distillation, the removal of the water can also be carried out by absorption, pervaporation or diffusion through membranes.

According to the invention, the silica particles are surface-modified in step (iii) by addition of a silane (S). The silane (S) has at least one, preferably precisely one, at least singly, preferably from singly to triply, preferably from doubly to triply, particularly preferably precisely triply alkoxylated silyl group. In addition, the silane has at least one alkyl, cycloalkyl or aryl substituent which may have heteroatoms which can be reactive toward an alcohol, an amine or an isocyanate.

For the purposes of the present invention, alkoxylated silyl groups are

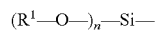

groups, where
$R^1$ is $C_1$-$C_{20}$-alkyl, preferably $C_1$-$C_4$-alkyl and
n is an integer from 1 to 3, preferably from 2 to 3 and particularly preferably 3.

Examples of $C_1$-$C_{20}$-alkyl are methyl, ethyl, isopropyl, n-propyl, n-butyl, isobutyl, sec-butyl, tert-butyl, n-hexyl, n-heptyl, n-octyl, 2-ethylhexyl, n-decyl, n-dodecyl, n-tetradecyl, n-hexadecyl, n-octadecyl and n-eicosyl.

Examples of $C_1$-$C_4$-alkyl are methyl, ethyl, isopropyl, n-propyl, n-butyl, isobutyl, sec-butyl and tert-butyl.

Preferred radicals $R^1$ are methyl, ethyl, n-butyl and tert-butyl, particularly preferably methyl and ethyl.

Substituents can be either reactive or unreactive toward an alcohol, an amine or an isocyanate. The unreactive substituents can be alkyl, cycloalkyl or aryl groups such as $C_1$-$C_{20}$-alkyl, e.g. methyl, ethyl, isopropyl, n-propyl, n-butyl, isobutyl, sec-butyl, tert-butyl, n-hexyl, n-heptyl, n-octyl, 2-ethylhexyl, n-decyl, n-dodecyl, n-tetradecyl, n-hexadecyl, n-octadecyl, n-eicosyl, cyclohexyl and phenyl.

Preferred compounds (S) are methyltrimethoxysilane, n-propyltriethoxysilane, dimethyldimethoxysilane, phenyltrimethoxysilane, n-octyltriethoxysilane, isobutyl-triethoxysilane, n-butyltrimethoxysilane, t-butyltrimethoxysilane, methyltriethoxysilane, benzyltriethoxysilane, trimethylmethoxysilane, vinyltrimethoxysilane, vinyltriethoxysilane, allyltrimethoxysilane, allyltriethoxysilane, butenyltriethoxysilane, n-decyltriethoxysilane, di-n-butyldimethoxysilane, diisopropyldimethoxysilane, dimethyldiethoxysilane, dodecylmethyldiethoxysilane, dodecyltriethoxysilane, ethyltrimethoxysilane, ethyltriethoxysilane, hexadecyltriethoxysilane, hexadecyltrimethoxysilane, hexyltrimethoxysilane, hexyltriethoxysilane, isobutylmethyltriethoxysilane, isobutyltrimethoxysilane, n-octadecyltriethoxysilane, n-octadecyltrimethoxysilane, n-octadecylmethyldimethoxysilane, n-octadecylmethyldiethoxysilane, n-octylmethyl-diethoxysilane, octyldimethylethylmethoxysilane, pentyltriethoxysilane, phenylmethyl-dimethoxysilane and phenyltriethoxysilane.

The unreactive substituents can also have heteroatoms, e.g. ether and thioether groups. A particular class of these substituents is made up of monofunctional polyoxyalkylene compounds, e.g. based on ethylene oxide and propylene oxide.

Preferred compounds (S) are 2-[methoxy(polyethylenoxy)propyl]trimethoxysilane, 3-methoxypropyltrimethoxysilane, bromophenyltrimethoxysilane, 3-bromopropyl-trimethoxysilane, 2-chloroethylmethyldimethoxysilane, (heptadecafluoro-1,1,2,2-tetrahydrodecyl)triethoxysilane, (heptadecafluoro-1,1,2,2-tetrahydrodecyl)trimethoxysilane, diethylphosphatoethyltriethoxysilane, 2-(diphenylphosphino)ethyltriethoxysilane, 3-(N,N-dimethylaminopropyl)trimethoxysilane, 3-methoxypropyltrimethoxysilane, 3-(methacryloxy)propyltrimethoxysilane, 3-acryloxypropyl-trimethoxysilane, 3-(methacryloxy)propyltriethoxysilane, 3-(methacryloxy)propylmethyldimethoxysilane.

The reactive groups are joined by alkylene, cycloalkylene or arylene groups which preferably have from 1 to 20 carbon atoms, preferably alkylene groups, as spacer groups to the silyl groups.

Examples are methylene, 1,2-ethylene (—CH$_2$—CH$_2$—), 1,2-propylene (—CH(CH$_3$)—CH$_2$—) and/or 1,3-propylene (—CH$_2$—CH$_2$—CH$_2$—), 1,2-, 1,3- and/or 1,4-butylene, 1,1-dimethyl-1,2-ethylene, 1,2-dimethyl-1,2-ethylene, 1,6-hexylene, 1,8-octylene or 1,10-decylene, preferably methylene, 1,2-ethylene, 1,2- or 1,3-propylene, 1,2-, 1,3- or 1,4-butylene, particularly preferably methylene, 1,2-ethylene, 1,2- and/or 1,3-propylene and/or 1,4-butylene and very particularly preferably methylene, 1,2-ethylene, 1,2- and/or 1,3-propylene.

Preferred reactive groups are a primary amino group, a hydroxyl group, a thiol group and an epoxy group.

Preferred compounds (S) are 2-(3,4-epoxycyclohexyl)ethyltriethoxysilane, 2-(3,4-epoxycyclohexyl)ethyltrimethoxysilane, 3-aminopropylmethyldimethoxysilane, 3-aminopropyldimethylmethoxysilane, 3-aminopropyldimethylethoxysilane, N-(2'-aminoethyl)-3-aminopropylmethyldimethoxysilane, N-(2'-aminoethyl)-3-aminopropylmethyldiethoxysilane, N-(2'-aminoethyl)-3-aminopropylmethoxysilane, N-(2'-aminoethyl)-3-aminopropylethoxysilane, 3-mercaptopropyltrimethoxysilane, 3-mercaptopropyltriethoxysilane, 4-aminobutyltriethoxysilane, 1-amino-2-(dimethylethoxysilyl)propane, (aminoethylaminoethyl)phenethyltrimethoxysilane, N-(2-aminoethyl)-3-aminopropyl-triethoxysilane, p-aminophenyltrimethoxysilane, 3-aminopropylmethyldiethoxysilane, 3-aminopropyltriethoxysilane, 3-aminopropyltrimethoxysilane, 11-aminoundecyl-triethoxysilane, (3-glycidoxypropyl)trimethoxysilane, (3-glycidoxypropyl)triethoxysilane, N-(hydroxyethyl)-N-methylaminopropyltrimethoxysilane, hydroxymethyltriethoxysilane, 3-mercaptopropylmethyldimethoxysilane, 3-mercaptopropylmethyldiethoxysilane, N-methylaminopropylmethyldimethoxysilane, bis(2-hydroxyethyl)-3-aminopropyl-triethoxysilane.

Particularly preferred compounds (S) are trialkoxysilanes substituted by the following groups:

CH$_2$—CH$_2$—CH$_2$—NH$_2$
—CH$_2$—CH$_2$—CH$_2$—SH
CH$_2$—CH$_2$—CH$_2$—NH—CH$_2$—CH$_2$—CH$_2$—NH$_2$
CH$_2$—CH$_2$—CH$_2$—N(CH$_2$—CH$_2$OH)$_2$

The groups mentioned react with isocyanate groups and thus form a covalent bond between the silicate particles and the PU matrix. Preference is also given to trialkoxysilanes which are substituted by a glycidoxypropyl group —CH$_2$—CH$_2$—CH$_2$—O—CH$_2$—CH(O)CH$_2$. The epoxy group can react with amino groups, for example of monofunctional polyether amines or components having hydroxyl groups, for example hyperbranched polyols.

It is also possible to use silane compounds which comprise two or more silane groups. Such compounds are described, for example, in WO2004/035649. Examples are: bis(3-methyldimethoxysilylpropyl)polypropylene oxide, bis(triethoxysilyl)ethane, bis(triethoxysilyl)octane, 1,6-bis(trimethoxysilyl)hexane, bis(methyldiethoxysilylpropyl)-amine and bis(triethoxysilylpropyl)amine.

The reaction with the compound (S) modifies the surface of the silica sol (K) used so that the compatibility between the originally polar silica sol and the polyol is improved. Particular effects can be achieved by means of a combination of various silanes, e.g. a combination of reactive and unreactive silanes. It is also possible to use mixtures of differently modified silica particles.

In general, (S) is used in an amount of from 0.1 to 20 μmol per m$^2$ of surface area of (K).

This generally corresponds to an amount of from 0.01 to 5 mmol of (S) per gram of (K), preferably from 0.05 to 4 mmol of (S) per gram of (K) and particularly preferably from 0.1 to 3 mmol of (S) per gram of (K).

For this purpose, the reaction with (S) is carried out with stirring at a temperature of from 10 to 100° C., preferably from 20 to 90° C., particularly preferably from 30 to 80° C.

The mixture is allowed to react under these reaction conditions for from 1 to 48 hours, preferably from 3 to 36 hours, particularly preferably from 4 to 24 hours.

The silane (S) is added in amounts of from 0.1 to 30 mol %, preferably from 0.3 to 25 mol % and particularly preferably from 0.5 to 20 mol %, based on the SiO$_2$ content.

The silane (S) can be added to the mixture of aqueous silica sol (K) and polyetherol (A) or polyether amine (B) obtained in step (i). The silane (S) can be added right at the beginning to the aqueous silica sol (K).

However, the silane (S) is preferably added after (i) admixing the mixture with the polyetherol or polyether amine and (ii) distilling off at least part of the water comprised in the silica sol. If the silane (S) is added only after the distillation step (ii), preference is given to carrying out a second distillation step in which any solvent introduced with the silane and also further volatile constituents are removed.

In an optional step (iv), the pH of the silicate-comprising polyetherol is set to a value of from 7 to 12. This is effected by addition of a basic compound. In the case of polyether amines, such an alteration of the pH is not necessary since the dispersions already have an alkaline pH. Suitable basic compounds are, in particular, strongly basic compounds such as alkali metal hydroxides (NaOH, KOH, LiOH) and alkali metal alkoxides. The reactivity of the polyol component can be increased by addition of the basic compound. This is attributed to acidic silanol groups on the surface of the silica particles being able to adsorb the amine catalyst, which reduces the reactivity of the polyurethane system. This can be countered by addition of a basic compound.

The adjustment of the pH by addition of a basic compound can also be carried out before addition of the silane. In one embodiment of the process of the invention, the pH is firstly brought to a value of from 7 to 12, any solvent introduced with the strongly basic compound is at least partly distilled off, the silane (S) is subsequently added and volatile constituents are distilled off after the silanization. In a further embodiment of the process of the invention, the silane (S) is added first, the pH is subsequently brought to from 7 to 12 by addition of the strongly basic compound and volatile constituents are removed after the silanization.

The silicate-comprising polyetherols or polyether amines produced according to the invention can be used as polyol component for producing polyurethanes. The field of use of the silicate-comprising polyols or polyether amines produced according to the invention is very broad. For example, they can be used for producing compact polyurethane, e.g. adhesives, coatings, binders, encapsulation materials, thermoplastic polyurethanes and elastomers. They can also be used for producing microcellular polyurethane foam, for example for shoe applications, structural foam, integral foam and RIM polyurethanes, for example for bumpers. Furthermore, they can be used for producing high-density foams, e.g. semirigid foam and carpet backing foam, low-density foams, e.g. flexible foam, rigid foam, thermomolding foam and packaging foam.

The silicate-comprising polyether amines of the invention can be used as polyurea components in polyurea applications, for example in polyurea spray applications.

Furthermore, the dispersions can be used in epoxy coatings or in reactive systems in which a polycarbonate reacts with the polyether amine.

The invention also provides for the use of silicate-comprising polyetherols for producing polyurethane materials and also the use of silicate-comprising polyether amines for producing polyurethane materials, polyurea materials, epoxy materials and materials which can be obtained by reaction of polycarbonates with polyether amines.

Polyurethane materials according to the invention are produced by mixing a) organic polyisocyanates with b) polyols and/or polyether amines comprising the silicate-comprising polyetherols (b1) and/or polyether amines (b2), if appropriate c) chain extenders and/or crosslinkers, d) blowing agents, e) catalysts and, if appropriate, f) auxiliaries and additives to form a reaction mixture and allowing this reaction mixture to react fully.

The polyisocyanates a) used for producing the polyurethane materials according to the invention comprise compounds based on diphenylmethane diisocyanate (hereinafter referred to as MDI), tolylene diisocyanate, isophorone diisocyanate, naphthalene diisocyanate or hexamethylene diisocyanate. For the present purposes, MDI includes 2,4-MDI, 4,4'-MDI and homologues having more than two rings and also mixtures thereof.

The polyisocyanate a) can be used in the form of polyisocyanate prepolymers. These polyisocyanate prepolymers can be obtained by reacting MDI as described above, for example at temperatures of from 30 to 100° C., preferably about 80° C., with polyetherols (b1) or polyesterols (b3) or poly-THF (pTHF) (b4) or mixtures thereof to form the prepolymer. As polyetherols (b1), preference is given to using the above-described polyetherols. Here, it is possible to use not only polyisocyanate prepolymers based on polyethers and polyisocyanate prepolymers based on polyesters but also mixtures thereof and polyisocyanate prepolymers based on polyethers and polyesters. The NCO content of the prepolymers is preferably, e.g. for MDI-based prepolymers, in the range from 2% to 30%, particularly preferably from 5% to 28% and in particular from 10% to 25%.

It is also possible to use the silica-comprising polyetherol or polyether amine dispersions of the invention as polyol component in the preparation of prepolymers.

If appropriate, customary chain extenders can be added to the abovementioned polymers in the preparation of the isocyanate prepolymers. Such substances are described below under c).

As additional polyols or polyether amines b), it is possible to use the polyetherols (b1) and/or polyether amines (b2) which are also used for producing the silica-comprising dispersions. However, it is additionally also possible to use other polyetherols (b1) and polyether amines (b2) and polyesterols (b3) and pTHF (b4). Suitable polyols are described in: The Polyurethane Book, Randall and Lee, Wiley 2002, pages 99-112.

For example, it is additionally possible to use polyesterols (b3) prepared by condensation of polyfunctional alcohols, preferably diols, having from 2 to 12 carbon atoms, preferably from 2 to 6 carbon atoms, with polyfunctional carboxylic acids having from 2 to 12 carbon atoms, for example succinic acid, glutaric acid, adipic acid, suberic acid, azelaic acid, sebacic acid, decanedicarboxylic acid, maleic acid, fumaric acid, phthalic acid, isopthalic acid, terephthalic acid and the isomeric naphthalenedicarboxylic acids. Suitable polytetrahydrofuran (pTHF) (b4) generally has a molecular weight of from 550 to 4000 g/mol, preferably from 750 to 2500 g/mol, particularly preferably from 750 to 1200 g/mol.

As chain extenders c), use is made of substances having a molecular weight of preferably less than 600 g/mol, particularly preferably from 56 to 600 g/mol, with chain extenders having two hydrogen atoms which are reactive toward isocyanates. These can be used individually or preferably in the form of mixtures. Preference is given to using diols having molecular weights of less than 600, particularly preferably from 60 to 400 and in particular from 60 to 300. Possible diols are, for example, aliphatic, cycloaliphatic and/or araliphatic diols having from 2 to 14, preferably from 2 to 10, carbon atoms, e.g. ethylene glycol, 1,3-propanediol, pentanediol, tripropylene glycol, 1,10-decanediol, 1,2-, 1,3-, 1,4-dihydroxycyclohexane, diethylene glycol, dipropylene glycol and preferably 1,4-butanediol, 1,6-hexanediol and bis(2-hydroxyethyl)hydroquinone, and low molecular weight hydroxyl-comprising polyalkylene oxides based on ethylene oxide and/or 1,2-propylene oxide and the abovementioned diols as starter molecules. Particular preference is given to using monoethylene glycol, diethylene glycol, 2-methyl-1,3-propanediol, 1,4-butanediol, 1,5-pentanediol, 1,6-hexanediol or mixtures thereof as chain extenders c.

If appropriate, crosslinkers can also be used in addition to chain extenders. Crosslinkers are substances having a molecular weight of less than 450 g/mol and three hydrogen atoms which are reactive toward isocyanate, for example triols such as 1,2,4-, 1,3,5-trihydroxycyclohexane, glycerol and trimethylolpropane, or low molecular weight hydroxyl-comprising polyalkylene oxides based on ethylene oxide and/or 1,2-propylene oxide and the abovementioned triols as starter molecules.

If chain extenders c) are employed, they are advantageously used in amounts of from 1 to 60% by weight, preferably from 1.5 to 50% by weight and in particular from 2 to 40% by weight, based on the weight of the components (b) to (f).

Furthermore, blowing agents d) and/or water are present in the production of polyurethane foams. As blowing agents d), it is possible to use, in addition to water, generally known chemically and/or physically acting compounds. For the purposes of the present invention, chemical blowing agents are compounds which react with isocyanate to form gaseous products, for example water or formic acid. Physical blowing agents are compounds which are dissolved or emulsified in the starting materials for polyurethane production and vaporize the conditions of polyurethane formation. These are, for example, hydrocarbons, halogenated hydrocarbons and other compounds, for example perfluorinated alkanes such as perfluorohexane, chlorofluorocarbons and ethers, esters, ketones, acetals and also inorganic and organic compounds which liberate nitrogen on heating, or mixtures thereof, for example (cyclo)aliphatic hydrocarbons having from 4 to 8 carbon atoms or fluorinated hydrocarbon atoms such as Solkane® 365 mfc from Solvay Fluorides LLC.

As catalysts e) for producing the polyurethane materials, preference is given to using compounds which strongly accelerate the reaction of the blowing agent with the compounds a) having isocyanate groups. Mention may be made of, for example, amidines such as 2,3-dimethyl-3,4,5,6-tetrahydropyrimidine, tertiary amines such as triethylamine, tributylamine, dimethylbenzylamine, N-methylmorpholine, N-ethylmorpholine, N-cyclohexylmorpholine, N,N,N',N'-tetramethylethylenediamine, N,N,N',N'-tetramethylbutanediamine, N,N,N',N'-tetramethylhexanediamine, pentamethyldiethylenetriamine, bis(dimethylaminoethyl)ether, urea, (bis(dimethyl-aminopropyl)urea, dimethylpiperazine, 1,2-dimethylimidazole, 1-azabicyclo[3.3.0]octane and preferably 1,4-diazabicyclo [2.2.2]octane and alkanolamine compounds such as triethanolamine, triisopropanolamine, N-methyldiethanolamine and N-ethyldiethanolamine and dimethylethanolamine, N,N-dimethylethanolamine, N,N-dimethylcyclohexylamine, bis (N,N-dimethylaminoethyl)ether, N,N,N',N',N"-pentamethyldiethylenetriamine, 1,4-diazabicyclo[2.2.2]octane, 2-(2-dimethylaminoethoxy)ethanol, 2-((2-dimethylaminoethoxy) ethylmethylamino)ethanol, 1-(bis(3-dimethylamino)propyl) amino-2-propanol, N,N',N"-tris(3-dimethylaminopropyl) hexahydrotriazine, bis(morpholinoethyl)ether, N,N-dimethylbenzylamine, N,N,N',N",N"-pentamethyldipropylenetriamine, N,N'-diethylpiperazine. Likewise possible are organic metal compounds, for example organic tin compounds such as tin(II) salts of organic carboxylic acids, e.g. tin(II) acetate, tin(II) octoate, tin(II) ethylhexanoate and tin(II) laurate, and the dialkyltin(IV) salts of organic carboxylic acids, e.g. dibutyltin diacetate, dibutyltin dilaurate, dibutyltin maleate, dibutyltin mercaptide and dioctyltin diacetate, and also bismuth carboxylates such as bismuth(III) neodecanoate, bismuth 2-ethylhexanoate and bismuth octanoate or mixtures thereof, phenylmercury propionate, lead octoate, potassium acetate/octoate, quaternary ammonium formates and iron acetylacetonate. The organic metal compounds can be used either alone or preferably in combination with strongly basic amines.

Preference is given to using from 0.001 to 5% by weight, in particular from 0.05 to 2% by weight, of catalyst or catalyst combination, based on the weight of the components a) to c).

If appropriate, auxiliaries and/or additives f) can also be added to the reaction mixture for producing the polyurethane materials. Mention may be made by way of example of surface-active substances, foam stabilizers, cell regulators, further mold release agents, fillers, dyes, pigments, hydrolysis inhibitors, odor-absorbing substances and fungistatic and/or bacteriostatic substances.

Possible surface-active substances are, for example, compounds which serve to aid homogenization of the starting materials and may also be suitable for regulating the cell structure. Mention may be made by way of example of emulsifiers such as the sodium salts of castor oil sulfates or fatty acids, and also salts of fatty acids with amines, e.g. diethylamine oleate, diethanolamine stearate, diethanolamine ricinoleate, salts of sulfonic acids, e.g. alkali metal or ammonium salts of dodecylbenzenesulfonic or dinaphthylmethanedisulfonic acid, and ricinoleic acid; foam stabilizers such as siloxane-oxyalkylene copolymers and other organopolysiloxanes, ethoxylated alkylphenols, ethoxylated fatty alcohols, paraffin oils, castor oil esters or ricinoleic esters, Turkey red oil and peanut oil, and cell regulators such as paraffins, fatty alcohols and dimethylpolysiloxanes. Oligomeric acrylates having polyoxyalkylene and fluoroalkane radicals as side groups are also suitable for improving the emulsifying action, the cell structure and/or stabilizing the foam. The surface-active substances are usually used in amounts of from 0.01 to 5 parts by weight, based on 100 parts by weight of the components a) to c).

The polyurethane materials according to the invention are produced by the one-shot or prepolymer process by means of the low-pressure or high-pressure technique. The foams can be produced as slabstock foam or as molded foam. These process variants are described, for example, in "The Polyurethanes Book" Randall and Lee, Eds, Wiley, 2002.

The invention is illustrated by the following examples.

EXAMPLES

A Transfer of Unmodified Silicon Dioxide Nanoparticles into Polyols or Polyether Amines and Production of Stable Silicon Dioxide Dispersions Example A1

150 g of polyol 1 were added to 500 g of a commercially available acidic silica sol (Levasil® 200E/20% from H.C. Starck GmbH & Co KG, Leverkusen, Germany, particle diameter based on the BET method: 15 nm, pH 2.5, silicon dioxide concentration: 20% by weight). The water was removed under reduced pressure and a temperature which was increased stepwise from 30° C. to 75° C. over a period of 6 hours, with the temperature being 75° C. over the last 1 to 2 hours. A stable, transparent silicon dioxide dispersion in the polyol having a silicon dioxide concentration of 40% by weight was obtained.

Example A2

150 g of polyol 2 were added to 500 g of a commercially available acidic silica sol (Levasil® 200E/20% from H.C. Starck GmbH & Co KG, Leverkusen, Germany, particle diameter based on the BET method: 15 nm, pH 2.5, silicon dioxide concentration: 20% by weight). The water was removed under reduced pressure and a temperature which was increased stepwise from 30° C. to 75° C. over a period of 6 hours, with the temperature being 75° C. over the last 1 to 2 hours. A stable, transparent silicon dioxide dispersion in the polyol having a silicon dioxide concentration of 40% by weight was obtained.

Example A3

150 g of polyol 3 were added to 500 g of a commercially available acidic silica sol (Levasil® 200E/20% from H.C. Starck GmbH & Co KG, Leverkusen, Germany, particle diameter based on the BET method: 15 nm, pH 2.5, silicon dioxide concentration: 20% by weight). The water was removed under reduced pressure and a temperature which was increased stepwise from 30° C. to 75° C. over a period of 6 hours, with the temperature being 75° C. over the last 1 to 2 hours. A stable, transparent silicon dioxide dispersion in the polyol having a silicon dioxide concentration of 40% by weight was obtained.

Example A4

150 g of polyol 4 were added to 500 g of a commercially available acidic silica sol (Levasil® 200E/20% from H.C. Starck GmbH & Co KG, Leverkusen, Germany, particle diameter based on the BET method: 15 nm, pH 2.5, silicon dioxide concentration: 20% by weight). The water was removed under reduced pressure and a temperature which was increased stepwise from 30° C. to 75° C. over a period of 6 hours, with the temperature being 75° C. over the last 1 to 2 hours. A stable, transparent silicon dioxide dispersion in the polyol having a silicon dioxide concentration of 40% by weight was obtained.

Example A5

150 g of polyol 5 were added to 500 g of a commercially available acidic silica sol (Levasil® 200E/20% from H.C. Starck GmbH & Co KG, Leverkusen, Germany, particle diameter based on the BET method: 15 nm, pH 2.5, silicon dioxide concentration: 20% by weight). The water was removed under reduced pressure and a temperature which was increased stepwise from 30° C. to 75° C. over a period of 6 hours, with the temperature being 75° C. over the last 1 to 2 hours. A stable, transparent silicon dioxide dispersion in the polyol having a silicon dioxide concentration of 40% by weight was obtained.

Example A6

150 g of polyol 6 were added to 500 g of a commercially available acidic silica sol (Levasil® 200E/20% from H.C. Starck GmbH & Co KG, Leverkusen, Germany, particle diameter based on the BET method: 15 nm, pH 2.5, silicon dioxide concentration: 20% by weight). The water was removed under reduced pressure and a temperature which was increased stepwise from 30° C. to 75° C. over a period of 6 hours, with the temperature being 75° C. over the last 1 to 2 hours. A stable, transparent silicon dioxide dispersion in the polyol having a silicon dioxide concentration of 40% by weight was obtained.

Example A7

150 g of polyol 7 were added to 500 g of a commercially available acidic silica sol (Levasil® 200E/20% from H.C. Starck GmbH & Co KG, Leverkusen, Germany, particle diameter based on the BET method: 15 nm, pH 2.5, silicon dioxide concentration: 20% by weight). The water was removed under reduced pressure and a temperature which was increased stepwise from 30° C. to 75° C. over a period of 6 hours, with the temperature being 75° C. over the last 1 to 2 hours. A stable, transparent silicon dioxide dispersion in the polyol having a silicon dioxide concentration of 40% by weight was obtained.

Example A8

150 g of polyether amine 1 were added to 500 g of a commercially available acidic silica sol (Levasil® 200E/20% from H.C. Starck GmbH & Co KG, Leverkusen, Germany, particle diameter based on the BET method: 15 nm, pH 2.5, silicon dioxide concentration: 20% by weight) with vigorous stirring. The water was removed under reduced pressure and a temperature which was increased stepwise from 30° C. to 75° C. over a period of 6 hours, with the temperature being 75° C. over the last 1 to 2 hours. A stable, transparent silicon dioxide dispersion in the polyol having a silicon dioxide concentration of 40% by weight was obtained.

Example A9

200 g of polyether amine 2 were added to 250 g of a commercially available acidic silica sol (Levasil® 200E/20% from H.C. Starck GmbH & Co KG, Leverkusen, Germany, particle diameter based on the BET method: 15 nm, pH 2.5, silicon dioxide concentration: 20% by weight) with vigorous stirring. The water was removed under reduced pressure and a temperature which was increased stepwise from 30° C. to 75° C. over a period of 6 hours, with the temperature being 75° C. over the last 1 to 2 hours. A stable, transparent silicon dioxide dispersion in the polyol having a silicon dioxide concentration of 20% by weight was obtained.

Example A10

400 g of a commercially available aqueous silica sol (Levasil® 200/30% from H.C. Starck GmbH & Co KG, Leverkusen, Germany, particle diameter based on the BET method: 15 nm, pH 9.0, silicon dioxide concentration: 30% by weight) were deionized to a pH of 2.1 by addition of DOWEX® MONOSPHERE® 650C(H) cation exchange resin. After filtration, 333 g of the deionized silica sol were mixed with 150 g of polyol 1. The water was removed under reduced pressure and a temperature which was increased stepwise from 30° C. to 75° C. over a period of 6 hours, with the temperature being 75° C. over the last 1 to 2 hours. A stable, transparent silicon dioxide dispersion in the polyol having a silicon dioxide concentration of 40% by weight was obtained.

Example A11

500 g of a commercially available aqueous silica sol (Levasil® 100/45% from H.C. Starck GmbH & Co KG, Leverkusen, Germany, particle diameter based on the BET method: 30 nm, pH 10.0, silicon dioxide concentration: 45% by weight) were deionized to a pH of 2.1 by addition of DOWEX® MONOSPHERE® 650C(H) cation exchange resin. After filtration, 444.4 g of the deionized silica sol were mixed with 300 g of polyol 3. The water was removed under reduced pressure and a temperature which was increased stepwise from 30° C. to 75° C. over a period of 6 hours, with the temperature being 75° C. over the last 1 to 2 hours. A stable, transparent silicon dioxide dispersion in the polyol having a silicon dioxide concentration of 40% by weight was obtained.

Example A12

400 g of a commercially available aqueous silica sol (Levasil® 300/30% from H.C. Starck GmbH & Co KG, Leverkusen, Germany, particle diameter based on the BET method: 15 nm, pH 10.0, silicon dioxide concentration: 30% by weight) were deionized to a pH of 2.1 by addition of DOWEX® MONOSPHERE® 650C(H) cation exchange resin. After filtration, 333 g of the deionized silica sol were mixed with 150 g of polyol 1. The water was removed under reduced pressure and a temperature which was increased stepwise from 30° C. to 75° C. over a period of 5 hours, with the temperature being 75° C. over the last 1 to 2 hours. A stable, transparent silicon dioxide dispersion in the polyol having a silicon dioxide concentration of 40% by weight was obtained.

Example A13

200 g of a commercially available aqueous silica sol (Levasil® 200/30% from H.C. Starck GmbH & Co KG, Leverkusen, Germany, particle diameter based on the BET method: 15 nm, pH 9.0, silicon dioxide concentration: 30% by weight) were brought to a pH of 2.2 by addition of 5.8 g of 10% strength sulfuric acid and mixed with 240 g of polyol 1. The water was removed under reduced pressure and a temperature which was increased stepwise from 30° C. to 75° C. over a period of 4 hours, with the temperature being 75° C. over the last 1 to 2 hours. A stable, transparent silicon dioxide dispersion in the polyol having a silicon dioxide concentration of 20% by weight was obtained.

B Surface Modification of Silicon Dioxide Nanoparticles in Polyetherols and Polyether Amines The silicon dioxide concentration of the dispersion after surface modification is based on pure silicon dioxide.

Example B1

In a 1 l glass flask equipped with a stirrer, 262.5 g of the silicon dioxide dispersion in polyol 1 from example A1 having a silicon dioxide concentration of 40% by weight, 37.5 g of polyol 1, 6.2 g (0.36 mol) of water and 15.7 g (0.2 mol) of methyltrimethoxysilane (from Merck Schuchardt OHG, Hohenbrunn, Germany) were mixed. The mixture obtained was stirred at 70° C. for 24 hours. Volatile constituents were distilled off under reduced pressure at 75° C. over a period of 2 hours. A stable, transparent silicon dioxide dispersion in the polyol having a silicon dioxide concentration of 35% by weight was obtained.

Example B2

In a 1 l glass flask equipped with a stirrer, 225 g of the silicon dioxide dispersion in polyol 3 from example A3 having a silicon dioxide concentration of 40% by weight, 75 g of polyol 3, 26.5 g (0.12 mol) of 3-aminopropyltriethoxysilane (from Merck Schuchardt OHG, Hohenbrunn, Germany) were mixed. The mixture obtained was stirred at 70° C. for 24 hours. Volatile constituents were distilled off under reduced pressure at 75° C. over a period of 2 hours. A stable, transparent silicon dioxide dispersion in the polyol having a silicon dioxide concentration of 30% by weight was obtained.

Example B3

In a 1 l glass flask equipped with a stirrer, 500 g of a silicon dioxide dispersion in polyether amine 1 having a silicon dioxide concentration of 40% by weight from example A8, 44.4 g (0.05 mol) of trimethoxysilane (obtainable by reacting 3-(2,3-epoxypropoxy)propyltrimethoxysilane and Jeffamine XTJ-505) were mixed. The resulting mixture was stirred at room temperature for 24 hours. Volatile constituents were separated off under reduced pressure at 75° C. over a period of 2 hours, giving a stable, transparent silicon dioxide dispersion in the polyether amine having a silicon dioxide concentration of 40% by weight. To prepare the silane, 28.3 g (0.12 mol) of 3-(2,3-epoxypropoxy)propyltrimethoxysilane (from Merck Schuchardt OHG, Hohenbrunn, Germany) and 71.7 g (0.12 mol) of Jeffamine XTJ-505 (from Huntsman) were mixed and stirred overnight at 60° C.

Example B4

In a 1 l glass flask equipped with a stirrer, 200 g of the silicon dioxide dispersion in polyol 2 from example A2 having a silicon dioxide concentration of 40% by weight, 200 g of polyol 2 and 11.9 g (0.09 mol) of methyltrimethoxysilane (from Merck Schuchardt OHG, Hohenbrunn, Germany) were mixed. The mixture obtained was stirred at 70° C. for 24 hours. Volatile constituents were distilled off under reduced pressure at 75° C. over a period of 2 hours. A stable, transparent silicon dioxide dispersion in the polyol having a silicon dioxide concentration of 20% by weight was obtained.

Example B5

In a 1 l glass flask equipped with a stirrer, 150 g of a commercially available acidic aqueous silica sol (Levasil® 200E/20% from H.C. Starck GmbH & Co KG, Leverkusen, Germany, particle diameter based on the BET method: 15 nm, pH 2.5, silicon dioxide concentration: 20% by weight), 45 g of polyol 1 and 4.5 g (0.03 mol) of methyltrimethoxysilane (from Merck Schuchardt OHG, Hohenbrunn, Germany) were mixed. The mixture obtained was stirred at room temperature for 24 hours. Water and further volatile constituents were removed by distillation under reduced pressure and a temperature which was increased stepwise from 30° C. to 75° C. over a period of 4 hours, with the temperature being 75° C. in the last 1 to 2 hours. A stable, transparent silicon dioxide dispersion in the polyol having a silicon dioxide concentration of 40% by weight was obtained.

C Mechanical Properties of the Polyurethanes and Polyurea Compounds Reinforced with the Silicon Dioxide Nanoparticles The production of specimens for mechanical testing was carried out by the methods customary in the polyurethane industry. The starting materials used for producing the polymer materials of the examples are shown in tables 4a-e.

The isocyanate was added to the well mixed and homogenized blend of polyol comprising silicon dioxide particles and other starting materials of the polyurethane formulation. The formulations were (except for example C2) poured into an open mold, allowed to react and cured at 70° C. to give a plate having dimensions of 200×150×2 mm. The material obtained was heated at 80° C. for 2 hours and the mechanical properties were determined on corresponding test specimens which had been cut out from the middle part of the plate. The finished polyurethane or polyurea comprised up to 10% by weight of $SiO_2$. The measurements were carried out using the test methods customary for the testing of polyurethane polymers.

Example C1

26.0 g of polyol 1, 33.2 g of Sovermol® 805 (an oil-based branched polyether/ester polyol having an OH number of 170), 0.33 g of a 33% strength by weight solution of 1,4-diazabicyclo[2.2.2]octane in triethylene glycol (Dabco® 33LV) and 8.29 g of K—Ca—Na zeolite paste were added to 23.7 g of the silicon dioxide dispersion from example B1. The mixture obtained was mixed in a high-speed mixer for one minute and then left to stand at room temperature for 30 minutes. 58.5 g of polymeric MDI having an NCO value of 31.2 (Lupranat® M 20 S) were added and the mixture was, after stirring for one minute in a high-speed mixer, poured into an open mold, allowed to react and cured at 70° C. to give a plate having dimensions of 200×150×2 mm. The material obtained was heated at 80° C. for 2 hours and the mechanical properties were determined on corresponding test specimens which had been cut out from the middle part of the plate. The results are shown in table 1

TABLE 1

| Example | C1 |
|---|---|
| Open time [min] | 6.0 |
| Density [g/cm$^3$] | 1.060 |
| Shore hardness D | 83 |
| Tensile strength [MPa] | 57.9 |
| Elongation at break [%] | 6 |
| Tear propagation resistance [kN/m] | 39.3 |
| Abrasion [mg] | 509 |
| E modulus [MPa] | 2646 |

Example C2

937.9 g of diethyltoluenediamine, 806.3 g of the silicon dioxide dispersion from example B3 and 268.8 g of polyether amine 1 were added to 2723.3 g of polyether amine D 2000 (an amine-terminated polyoxypropylene diol having a molecular weight of 2000 g/mol and a total amine number of 56.7 mg/g). The mixture obtained was mixed and homogenized in a laboratory stirrer at 500 rpm for one minute and then left to stand at room temperature for 30 minutes. The blend was mixed in a volume ratio of 1:1 with an isocyanate prepolymer based on Lupranat MI (a mixture of 2,4'- and 4,4'-MDI) and Lupranol® 1000 having an NCO value of 15% in a Graco E-10 reactor and sprayed by means of a Graco Fusion AP gun equipped with an AR2020 mixing chamber onto a steel sheet which had been treated with a mold release agent. The temperature of the blend was 70° C. and the processing pressure was in the range from 100 to 110 bar for both components. After curing, the sprayed-on elastomer was removed from the steel plate and left to stand at room temperature for one week. The mechanical properties were determined on corresponding test specimens which had been cut out from the plate. The results are shown in table 2.

TABLE 2

| Example | C2 |
|---|---|
| Density [g/cm$^3$] | 1.054 |
| Shore hardness A | 92 |
| Tensile strength [MPa] | 24 |
| Elongation at break [%] | 430 |
| Tear propagation resistance [kN/m] | 56 |
| Abrasion [mg] | 150 |
| Flammability (MVSS) | Self-extinguishing |

Example C3

23.1 g of polyol 2, 2.21 g of K—Ca—Na zeolite and 0.12 g of catalyst KX 324 (catalyst of the potassium carboxylate type) were added to 37.3 g of the silicon dioxide dispersion from example B4. The mixture obtained was mixed in a high-speed mixer for one minute and then left to stand at room temperature for 30 minutes. 87.5 g of Lupranat® MM 103 (a uretonimine-modified 4,4'-MDI variant having an NCO value of 29.5%) were added and the mixture was, after stirring in a high-speed mixer for 1 minute, poured into an open mold, allowed to react and cured at 70° C. to give a plate having dimensions of 200×150×2 mm. The material obtained was heated at 80° C. for 2 hours and the mechanical properties were determined on corresponding test specimens which had been cut out from the middle part of the plate. The results are shown in table 3.

TABLE 3

| Example | C3 |
|---|---|
| Shore hardness D | 82 |
| Tensile strength [MPa] | 64 |
| Elongation at break [%] | 24 |
| E modulus [MPa] | 2004 |

D Comparative Examples

Example D1

100 g of a commercially available aqueous silica sol (Levasil® 200/30% from H.C. Starck GmbH & Co KG, Leverkusen, Germany, particle diameter based on the BET method: 15 nm, pH 9.0, silicon dioxide concentration: 30% by weight) were mixed with 45 g of polyol 1. The water was removed under reduced pressure at a temperature which was increased stepwise from 30° C. to 75° C., with a gel-like product being obtained during drying.

Example D2

100 g of a commercially available aqueous silica sol (Levasil® 200/30% from H.C. Starck GmbH & Co KG, Leverkusen, Germany, particle diameter based on the BET method: 15 nm, pH 9.0, silicon dioxide concentration: 30% by weight) were mixed with 270 g of polyol 1, with a gel-like product being obtained immediately.

Example D3

100 g of a commercially available aqueous silica sol (Levasil® 200/30% from H.C. Starck GmbH & Co KG, Leverkusen, Germany, particle diameter based on the BET method: 15 nm, pH 9.0, silicon dioxide concentration: 30% by weight) were mixed with 45 g of polyether amine 1. The water was removed under reduced pressure at a temperature which was increased stepwise from 30° C. to 75° C., with a gel-like product being obtained during drying.

Example D4

100 g of a commercially available aqueous silica sol (Levasil® 300/30% from H.C. Starck GmbH & Co KG, Leverkusen, Germany, particle diameter based on the BET method: 9 nm, pH 10.0, silicon dioxide concentration: 30% by weight) were mixed with 120 g of polyol 1, with a gel-like product being obtained immediately.

Example D5

100 g of a commercially available aqueous silica sol (Levasil® 300/30% from H.C. Starck GmbH & Co KG, Leverkusen, Germany, particle diameter based on the BET method: 9 nm, pH 10.0, silicon dioxide concentration: 30% by weight) were mixed with 120 g of polyol 3, with a gel-like product being obtained immediately.

Example D6

100 g of a commercially available aqueous silica sol (Levasil® 100/45% from H.C. Starck GmbH & Co KG, Leverkusen, Germany, particle diameter based on the BET method: 30 nm, pH 10.0, silicon dioxide concentration: 45% by weight) were mixed with 180 g of polyol 1, with a gel-like product being obtained immediately.

Example D7

100 g of a commercially available aqueous silica sol (Levasil® 100/45% from H.C. Starck GmbH & Co KG, Leverkusen, Germany, particle diameter based on the BET method: 30 nm, pH 10.0, silicon dioxide concentration: 45% by weight) were mixed with 180 g of polyol 3, with a gel-like product being obtained immediately.

Starting Materials:

TABLE 4a

| Polyols | | |
|---|---|---|
| Polyol | Structure | OH number |
| Polyol 1 | GLY-PO | 400 |
| Polyol 2 | TMP-EO | 250 |
| Polyol 3 | TMP-PO | 860 |
| Polyol 4 | MEG-EO | 190 |
| Polyol 5 | TMP-EO | 935 |
| Polyol 6 | GLY-PO | 805 |
| Polyol 7 | GLY | 1825 |

GLY = Glycerol,
EO = Ethylene oxide,
PO = Propylene oxide,
MEG = Monoethylene glycol,
TMP = Trimethylolpropane TABLE 4b

| Polyether amines (all based on 100% propylene oxide) | | | |
|---|---|---|---|
| Polyether amine | Functionality | Molecular weight | Amine (total) meq/g |
| Polyether amine 1 | 2 | 430 | 4.4 |
| Polyether amine 2 | 3 | 440 | 6.4 |

TABLE 4c

| Isocyanates and additives | |
|---|---|
| Trade name | Manufacturer |
| Lupranat M 20 S | BASF |
| Lupranat MM 103 | BASF |
| Lupranat MI | BASF |
| Sovermol 805 | Cognis |

TABLE 4c-continued

| Isocyanates and additives | |
|---|---|
| Trade name | Manufacturer |
| DOWEX MONOSPHERE 650 C (H) | Dow Corning |
| K—Ca—Na zeolite paste | UOP |
| Dabco 33 LV | Air products |
| Catalyst KX 324 | BASF |
| Diethyltoluenediamine | Albermarle |
| Jeffamine XTJ-505 | Huntsman |
| Lupranol 1000 | BASF |
| Polyether amine D 2000 | BASF |

TABLE 4d

| Silica sols | | | | |
|---|---|---|---|---|
| Name | Manufacturer | Particle size (ca. nm) | $SiO_2$ (wt %) | Surface area ($m^2/g$) | pH |
| Levasil 100/45% | H.C. Starck | 30 | 45 | 100 | 10.0 |
| Levasil 200/30% | H.C. Starck | 15 | 30 | 200 | 9.0 |
| Levasil 200E/20% | H.C. Starck | 15 | 20 | 200 | 2.5 |
| Levasil 300/30% | H.C. Starck | 9 | 30 | 300 | 10.0 |

TABLE 4e

| Silanes | | | |
|---|---|---|---|
| Substance | Manufacturer | Formula | Molecular weight |
| Methyltrimethoxysilane | Merck | $CH_3(CH_3O)_3Si$ | 136.22 |
| Aminopropyltriethoxysilane | Merck | $NH_2C_3H_6(C_2H_5O)_3Si$ | 221.37 |
| 3-(2,3-Epoxypropoxy)propyl-trimethoxysilane | Merck | $CH_3(C_2H_2O)OC_3H_6(CH_3O)_3Si$ | 236.34 |

The invention claimed is:

1. A process for producing a silica dispersion comprising a polyetherol or a polyether amine, the process comprising:
   (i) admixing an aqueous silica sol (K) with at least one additive selected from the group consisting of a polyetherol (b1) comprising at least one ethylene oxide unit, a polyetherol (b1) comprising at least one propylene oxide unit, a polyether amine (b2) comprising at least one ethylene oxide unit, and a polyether amine (b2) comprising at least one propylene oxide unit,
   wherein:
      the aqueous silica sol (K) has:
         an average particle diameter of from 1 to 150 nm; and
         a silica content, calculated as $SiO_2$, of from 1 to 60% by weight based on the weight of the aqueous silica sol (K); and
         a pH of from 1 to 6; and the at least one additive has an average OH or amine functionality of from 2 to 6 and a number average molecular weight not to exceed 6000 g/mol;
(ii) distilling off at least part of water present in an admixed dispersion;
(iii) admixing an aqueous silica dispersion with at least one compound (S) comprising at least one monoalkoxylated silyl group and at least one substituent selected from the group consisting of an alkyl, a cycloalkyl, and an aryl, wherein:
the at least one substituent optionally has at least one group which is reactive toward an alcohol, an amine or an isocyanate in an amount of from 0.1 to 20 μmol of the at least one compound (S) per m² of surface area of the aqueous silica sol (K); and
the admixing (i) and the admixing (iii) can be carried out simultaneously or in succession in any order; and
(iv) optionally adjusting the pH of a resulting admixture from (iii) to a value of from 7 to 12 by adding a basic compound.

2. The process of claim 1, wherein the at least one additive is a polyetherol having an OH number of from 100 to 1825.

3. The process of claim 1, wherein the at least one additive is a polyether amine having a total amine content of from 0.3 to 15 meq/g.

4. The process of claim 1, wherein the at least one compound (S) comprises an at least singly alkoxylated silyl group of formula (I):

$(R^1—O—)_n—Si$  (I)

wherein:
$R^1$ represents a $C_1$-$C_{20}$-alkyl; and
n represents an integer from 1 to 3.

5. The process of claim 4, wherein:
$R^1$ represents a $C_1$-$C_4$-alkyl; and
n represents an integer from 2 or 3.

6. The process of claim 1, wherein the at least one compound (S) comprises at least one substituent selected from the group consisting of an unreactive alkyl, an unreactive cycloalkyl, and an unreactive aryl.

7. The process of claim 6, wherein the at least one substituent contains at least one heteroatom.

8. The process of claim 1, wherein the at least one substituent of the at least one compound (S) comprises at least one reactive group selected from the group consisting of a primary amino group, a hydroxyl group, a thiol group, and an epoxy group.

9. The process of claim 1, wherein the at least one substituent has at least one group which is reactive toward an alcohol, an amine or an isocyanate in an amount of from 0.1 to 20 μmol of the at least one compound (S) per m² of surface area of the aqueous silica sol (K).

10. The process of claim 1, wherein said process comprises adjusting the pH of the resulting admixture from (iii) to a value of from 7 to 12 by adding a basic compound.

11. The process of claim 10, wherein said process further comprises pH adjusting between the distilling (ii) and the admixing (iii) to a value of from 7 to 12 by adding a basic compound.

12. The process of claim 1, wherein:
the at least one substituent has at least one group which is reactive toward an alcohol, an amine or an isocyanate in an amount of from 0.1 to 20 μmol of the at least one compound (S) per m² of surface area of the aqueous silica sol (K); and
said process comprises adjusting the pH of the resulting admixture from (iii) to a value of from 7 to 12 by adding a basic compound.

13. The process of claim 12, wherein said process further comprises pH adjusting between the distilling (ii) and the admixing (iii) to a value of from 7 to 12 by adding a basic compound.

14. A process for producing a polyurethane material, comprising reacting the silica dispersion of claim 1 with at least one organic polyisocyanate.

15. The process of claim 1, wherein said process further comprises pH adjusting between the distilling (ii) and the admixing (iii) to a value of from 7 to 12 by adding a basic compound.

16. A process for producing a polyurethane material, comprising:
(1) mixing at least one organic polyisocyanate with:
(a) a polyol comprising a silicate-comprising polyetherol (b1) obtained by the process of claim 1, or
a polyether amine comprising a silicate-comprising polyether amine (b2) obtained by the process of claim 1 or
a mixture of said polyol and said polyether amine comprising a silicate-comprising polyether amine (b2);
(b) optionally at least one unit selected from the group consisting of a chain extender and a crosslinker;
(c) at least one blowing agent;
(d) at least one catalyst; and
(e) optionally at least one additional unit selected from the group consisting of an auxiliary and an additional additive,
to form a reaction mixture; and
(2) reacting the reaction mixture.

17. The process of claim 16, wherein the at least one organic polyisocyanate is mixed with at least one unit selected from the group consisting of a chain extender and a crosslinker.

18. The process of claim 16, wherein the at least one organic polyisocyanate is mixed with at least one additional unit selected from the group consisting of an auxiliary and an additional additive.

* * * * *